United States Patent
Ebitani et al.

(10) Patent No.: US 7,770,026 B2
(45) Date of Patent: Aug. 3, 2010

(54) DOCUMENT MANAGEMENT SYSTEM, INFORMATION PROCESSING DEVICE AND METHOD, AND COMPUTER PROGRAM

(75) Inventors: Kenji Ebitani, Kanagawa (JP); Atsushi Itoh, Kanagawa (JP); Yoshihiko Mitamura, Kanagawa (JP); Hideaki Ashikaga, Kanagawa (JP); Isao Yamaguchi, Kanagawa (JP)

(73) Assignee: Fuji Xerox Co., Ltd., Tokyo (JP)

(*) Notice: Subject to any disclaimer, the term of this patent is extended or adjusted under 35 U.S.C. 154(b) by 1099 days.

(21) Appl. No.: 11/199,310

(22) Filed: Aug. 9, 2005

(65) Prior Publication Data

US 2006/0190742 A1    Aug. 24, 2006

(30) Foreign Application Priority Data

Feb. 18, 2005    (JP) ............................. 2005-041708

(51) Int. Cl.
*G06F 11/30* (2006.01)
(52) U.S. Cl. ..................................................... 713/193
(58) Field of Classification Search .................. 713/193
See application file for complete search history.

(56) References Cited

U.S. PATENT DOCUMENTS 7,178,021 B1 * 2/2007 Hanna et al. ................ 713/155
2001/0018739 A1 * 8/2001 Anderson et al. ........... 713/176
2002/0129261 A1 * 9/2002 Cromer et al. .............. 713/193
2004/0096058 A1 * 5/2004 Cho et al. ..................... 380/28
2004/0186997 A1 * 9/2004 Todaka ........................ 713/168
2007/0297602 A1 * 12/2007 Hull et al. ..................... 380/28

FOREIGN PATENT DOCUMENTS

| JP | 2000-331101 A | 11/2000 |
|----|---------------|---------|
| JP | 2002-092186 A | 3/2002 |
| JP | 2002-259573 A | 9/2002 |
| JP | 2002-269243 A | 9/2002 |
| JP | 2004-140764 A | 5/2004 |
| JP | 2004-147253 A | 5/2004 |
| JP | 2004-265438 A | 9/2004 |

* cited by examiner

*Primary Examiner*—Kambiz Zand
*Assistant Examiner*—Teshome Hailu
(74) *Attorney, Agent, or Firm*—Oliff & Berridge, PLC

(57) ABSTRACT

An information processing device, which generates a document and performs encryption thereof, the information processing device includes an encryption processing section that generates an encrypted document through a document encryption processing using an encryption key, an encoding processing section that generates code data including a decryption key for decrypting the encrypted document and an ID, which serves as index data of the encrypted document, a document creating section that generates a code-recorded document, in which the code data is recorded, and a communication section that transmits the encrypted document and the ID to a server.

22 Claims, 7 Drawing Sheets

FIG. 3B

| ID | ENCRYPTED DOCUMENT STORING LOCATION (URL) |
|---|---|
| ABCDE0001 | http://www.abc.co.jp/download/ABCDE0001/aaa.xxx |
| | http://www.abc.co.jp/download/ABCDE0001/bbb.xxx |
| BCDEF0001 | http://www.abc.co.jp/download/BCDEF0001/aaa.xxx |
| | http://www.abc.co.jp/download/BCDEF0001/bbb.xxx |
| | |

FIG. 3A

| ID | ENCRYPTED DOCUMENT STORING LOCATION (URL) |
|---|---|
| 0001 | http://www.abc.co.jp/download/0001/aaa.xxx |
| | http://www.abc.co.jp/download/0001/bbb.xxx |
| 0002 | http://www.abc.co.jp/download/0002/aaa.xxx |
| | http://www.abc.co.jp/download/0002/bbb.xxx |
| 0003 | http://www.abc.co.jp/download/0003/aaa.xxx |
| | http://www.abc.co.jp/download/0003/bbb.xxx |
| | |

FIG. 4

*FIG. 5* ved by the doctor in
DOCUMENT MANAGEMENT SYSTEM, INFORMATION PROCESSING DEVICE AND METHOD, AND COMPUTER PROGRAM

BACKGROUND OF THE INVENTION

1. Field of the Invention

The present invention relates to a document management system, information processing device and method, and a computer program. More particularly, the present invention relates to a document management system that can prevent leakage of important information, such as individual information and the like, and that permits only a specified user to access, to information processing device and method, and to a computer program.

2. Description of the Related Art

In recent years, the computerization of various kinds of information is rapidly progressing. For example, charts used in a hospital or image data, such as roentgen photographs or the like imaged for a medical treatment are being computerized. In respective medical institutions, such data is stored in a database in electronic form to be used. Recently, with the reformation of a medical system, the specialization of each medical institution is apparent. Therefore, there are many cases in which the medical treatment for each person is performed by the cooperation of plural hospitals, not by one hospital. For example, there may be a case in which a patient, who has undergone the first medical examination at a small hospital, undergoes a next medical examination at a large medical institution, such as a specialized hospital, a university hospital, or the like, which is introduced by a doctor in charge.

As such, when the patient uses the plural hospitals, conventionally, the patient has brought a chart recorded in a paper medium, a letter of introduction, image data imaged for the medical treatment, an X-ray photograph film, and the like with himself and has submitted them to an introduction destination medical institution.

In recent years, a system has been suggested in which data is stored in a shared server on a computer network, which can be accessed by the respective medial institutions, such that medical information is managed and shared. In this system, various kinds of data corresponding to a patient can be extracted from information processing devices of the respective medical institutions, such as personal computers (PC) or the like, while the patient does not need to bring a paper, such as a paper medium, or an X-ray film with himself. In such a system using the shared server, it is possible to eliminate intricacy of the patient when he lost his belongings, such as charts, on the way or when he returns his belongings to an introduction source. Further, a medical examination record or the like at an introduction source medical institution can be read, and thus there is no case in which the patient undesirably undergoes the same examination at an introduction destination medical institution again.

As for sharing of medical information via a network, individual information of the patient may leak. That is, there is a problem in that the medical information flows out in view of security. In order to solve the above-described security problem, many configurations have been suggested.

For example, in JP-A-2004-265438, JP-A-2002-259573, JP-A-2000-331101 and JP-A-2002-269243, a configuration in which shared information is encrypted, a configuration in which the introduction source sets the access authority of the introduction destination, and a configuration in which an access is controlled by an ID or password are disclosed. However, in the methods disclosed in the related art, even when the patient is absent, the access to the information may be performed, and thus leakage of the information may occur against the intension of the patient.

In order to solve the above-described problem, for example, in JP-A-2002-92186, a method has been suggested in which information about unique physical features of the patient (the fingerprint, the iris of the eye, the image of the fundus oculi, or the like) is used for an information access control. In this configuration, when the patient is absent, the access to the information cannot be performed, and thus individual information can be prevented from leaking to some degree. However, as for such information, the authentication process of the patient himself is required. Accordingly, at the time of the receipt or medical examination, downloading of the information is performed. In this case, however, downloading may take much time according to the amount of information and the communication capacity or speed, and thus the receipt time or the medical examination time may be delayed.

SUMMARY OF THE INVENTION

The present invention has been made in consideration of the above-described problems, and the present invention provides a document management system that can prevent leakage of data, such as medical information, individual information, or the like, and that permits only a specified user to access data, information processing device and method, and a computer program.

According to an aspect of the present invention, an information processing device, which generates a document and performs encryption thereof, the information processing device includes an encryption processing section that generates an encrypted document through a document encryption processing using an encryption key, an encoding processing section that generates code data including a decryption key for decrypting the encrypted document and an ID, which serves as index data of the encrypted document, a document creating section that generates a code-recorded document, in which the code data is recorded, and a communication section that transmits the encrypted document and the ID to a server.

According to an aspect of the present invention, an information processing device, which executes a decoding process of an encrypted document, the information processing device includes a code analyzing section that reads code data from a code-recorded document, in which code data including a decryption key and an ID serving as index data of the encrypted document is recorded, and that executes an analysis process, a decryption key acquiring section that acquires the decryption key included in data analyzed by the code analyzing section, and a decryption processing section that executes a decoding process of an encrypted document corresponding to an ID analyzed by the code analyzing section using the decryption key acquired by the decryption key acquiring section.

According to an aspect of the present invention, a document management system includes a document generating device that generates a document and performs encryption thereof, an information shared server that stores an encrypted document generated by the document generating device, and a document utilizing device that acquires and decodes the encrypted document stored in the information shared server. The document generating device has an encryption processing section that executes an encryption process of the document to generate the encrypted document using an encryption key, a document creating section that generates a code-recorded document, in which code data including a decryption key for the decryption process of the encrypted document and an ID serving as index data of the encrypted document is recorded, and a communication section that transmits the encrypted document and the ID to the information shared server. The information shared server has a database, from which the encrypted document can be acquired with the ID as an index. The document utilizing device has a code analyzing section that analyzes code data recorded in the code-recorded document to acquire the decryption key and the ID, and a decryption processing section that decodes the encrypted document acquired from the information shared server with the ID as an index.

According to an aspect of the present invention, an information processing method, which generates a document and performs encryption thereof, the information processing method includes generating an encrypted document through a document encryption processing using an encryption key, generating code data including a decryption key and an ID serving as index data of the encrypted document, generating a code-recorded document, in which code data is recorded, and transmitting the encrypted document and the ID to a server.

According to an aspect of the present invention, an information processing method, which executes a decoding process of an encrypted document, the information processing method includes reading code data from a code-recorded document, in which code data including a decryption key and an ID serving as index data of an encrypted document is recorded, and executing an analysis processing, acquiring the decryption key included in data analyzed in the analysis processing, and executing a decrypting process of an encrypted document corresponding to an ID analyzed in the analysis processing by using the decryption key acquired in the acquiring the decryption key.

According to an aspect of the present invention, a storage medium readable by a computer, the storage medium storing a program of instructions executable by the computer to perform a function for performing a generation processing and an encryption process of a document, the function includes the steps of generating an encrypted document through a document encryption processing using an encryption key, generating code data including a decryption key and an ID serving as index data of the encrypted document, generating a code-recorded document, in which code data is recorded, and transmitting the encrypted document and the ID to a server.

According to an aspect of the present invention, a storage medium readable by a computer, the storage medium storing a program of instructions executable by the computer to perform a function for performing a decoding process of an encrypted document, the function includes the steps of reading code data from a code-recorded document, in which code data including a decryption key and an ID serving as index data of an encrypted document is recorded, and executing an analysis processing, acquiring the decryption key included in data analyzed in the analysis processing, and executing a decoding process of an encrypted document corresponding to an ID analyzed in the analysis processing by using the decryption key acquired in the acquiring the encryption key.

BRIEF DESCRIPTION OF THE DRAWINGS

Embodiments of the present invention will be described in detail based on the following figures, wherein.

DETAILED DESCRIPTION OF THE INVENTION

Hereinafter, a document management system, information processing device and method, and a computer program according to an embodiment of the present invention will be described in detail with reference to the drawings.

First, the outline of the configuration of the system of the present invention will be described with reference to FIG. 1. Moreover, in the embodiment described below, as a target document of the management, a document issued from a medical institution, for example, a document for a medical treatment, such as a chart, a letter of introduction, X-ray film data, diagnosis image data, or the like is exemplified, but the present invention is not limited to the document for a medical treatment. For example, resident information or financial information, or various kinds of confidential information in an organization, such as a company or the like, can be used.

Figure 1:
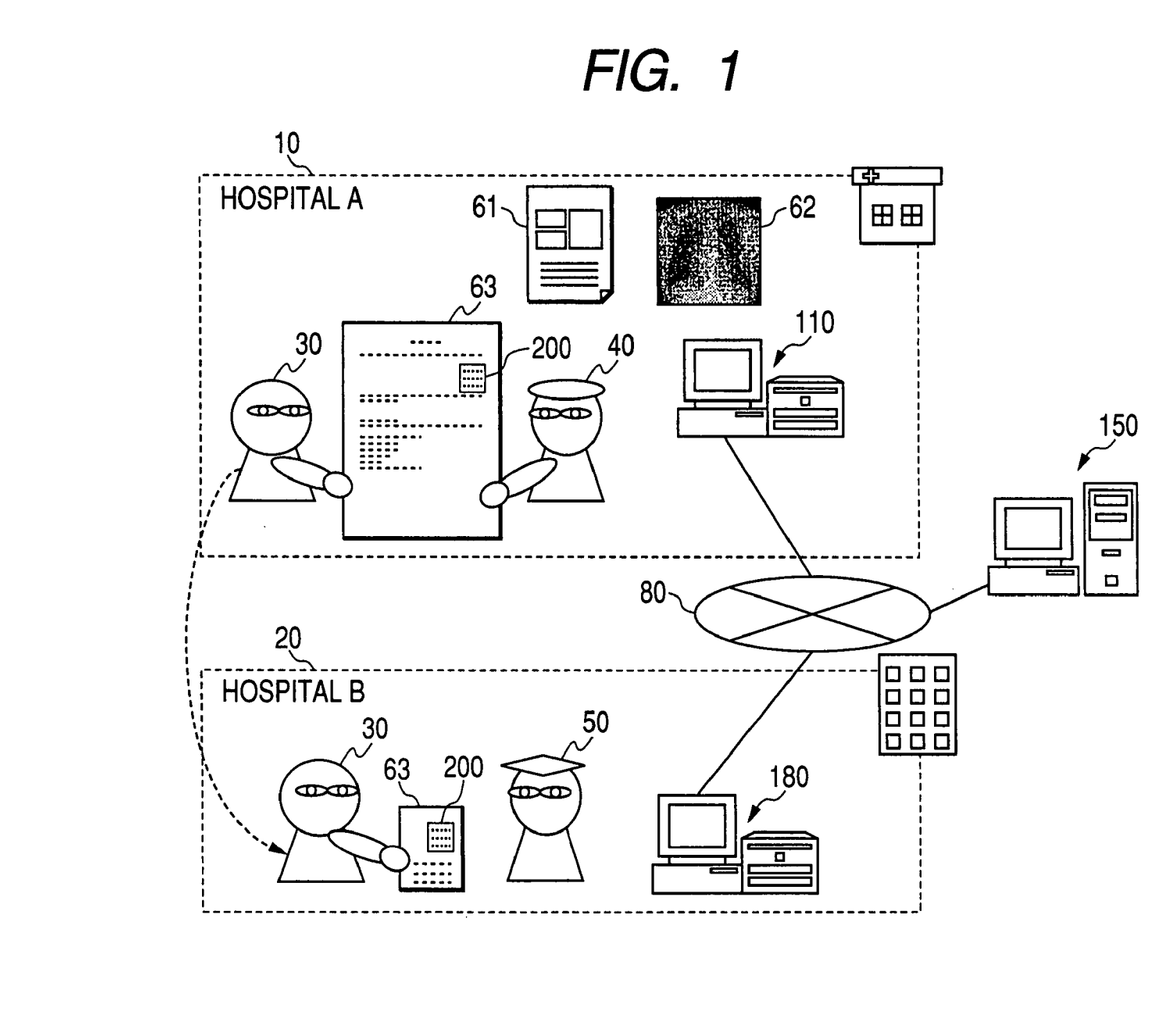
FIG. 1 is a diagram illustrating an outline of a document management system according to the present invention.

In FIG. 1, it is assumed that a patient 30 undergoes the medical examination of a doctor A 40 at a hospital A 10, a hospital B 20 is introduced to the patient 30 through the introduction of the doctor A 40, and the patient 30 undergoes the medical examination of a doctor B 50 at the hospital B 20.

At the hospital A 10, the doctor A 40 creates a medical examination document including a chart 61, diagnosis image data 62, and the like in the medial examination of the patient 30. The medical examination document is transmitted from an information processing device A 110, such as a personal computer (PC) or the like, provided at the hospital A 10 to an information shared server 150 connected to the information processing device A 110 via a network 80 as electronic data and is stored in the information shared server 150.

Moreover, the medical examination document, such as the chart 61, diagnosis image data 62, and the like, is individual information. In order to prevent leakage of individual information, the medical examination document is subjected to an encryption processing in the information processing device A 110 and is transmitted via the network 80 as encrypted data and is stored in the information shared server 150. The information processing device A 110 generates an encryption key based on a random number or the like and performs the encryption processing on the medical examination document, such as the chart 61, diagnosis image data 62, or the like, based on the generated encryption key to generate encrypted document data.

Further, the doctor A 40 introduces a hospital B 20 for a specialized treatment to the patient 30, creates a letter of introduction 63, and gives the letter of introduction 63 to the patient 30. In the letter of introduction 63, code data 200 is recorded, in addition to information required for a general letter of introduction. In code data 200, identification information (ID) for specifying data stored in the information shared server 150 and encryption key data thereof are included.

The patient 30 brings the letter of introduction 63, in which code data 200 is recorded, with him and hands over the letter of introduction 63 to the doctor B 50 or a receptionist of the hospital B 20 according to code data 200 recorded in the letter of introduction 63. The doctor B 50 or an operator of the hospital B 20 accesses to the information shared server 150 via the network 80 from an information processing device B 180, which is provided at the hospital B 20 to acquire an encrypted medical treatment document corresponding to the patient 30, executes a decoding process of the encrypted document acquired from the information shared server 150 using the encryption key included in code data 200, and obtains the medical examination document, such as the chart, diagnosis image data, corresponding to the patient 30.

Next, the configuration of the information processing device A 110 and the details of the processing will be described with reference to FIG. 2. The information processing device A 110 executes a process of generating the encrypted document as encrypted data of medical examination information, such as the chart and the like, and storing the encrypted document in the information shared server 150, and performs a process of outputting a code-recorded document (the letter of introduction 63) in which code data including the encryption key used for the encryption of the encrypted document is recorded.

The information processing device A 110 has, for example, a personal computer (PC), or the like. FIG. 2 is a functional block diagram showing processing functions, which are executed in the parts of the information processing device A 110 and a data processing section, in respective blocks.

Figure 2:
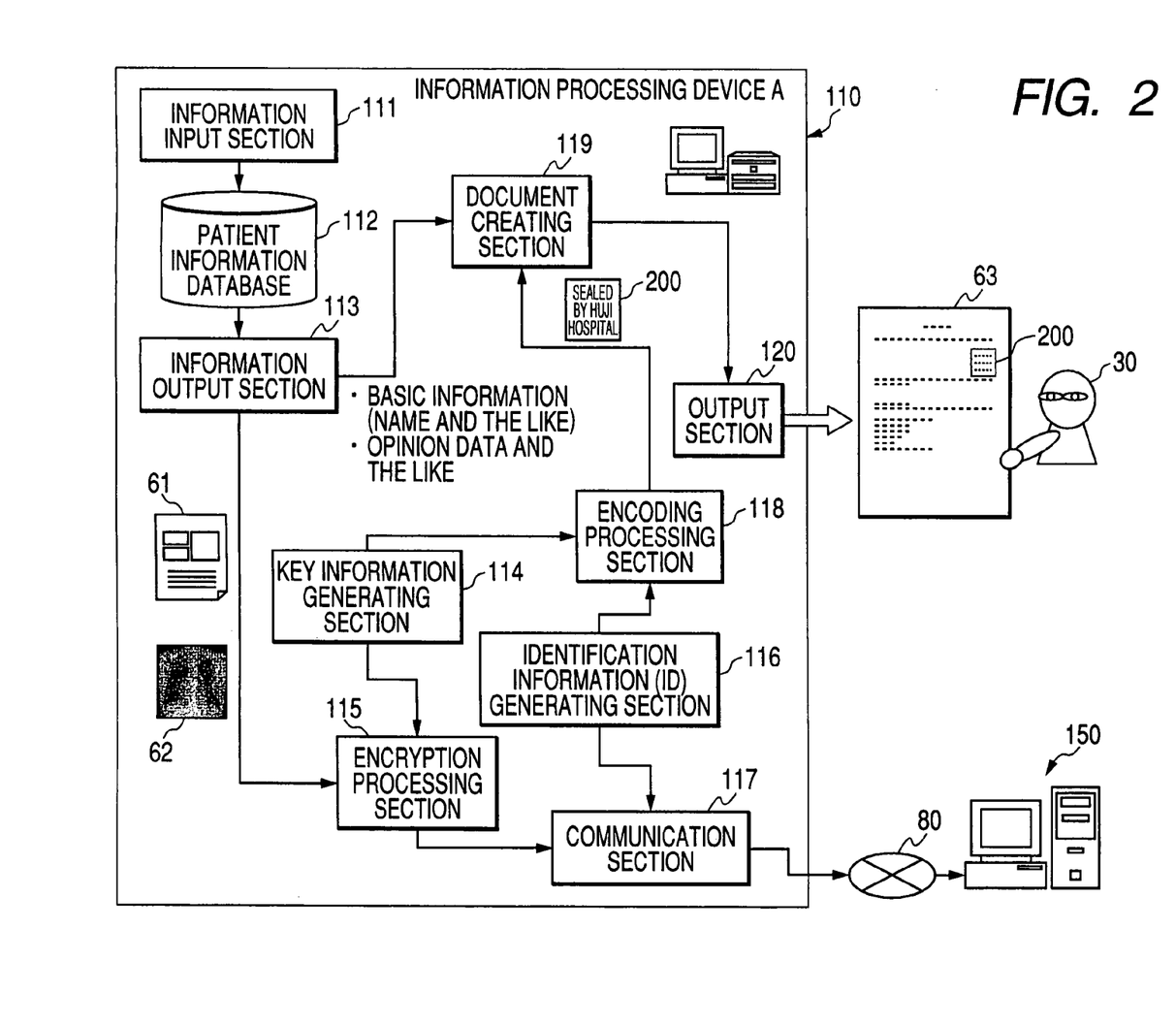
FIG. 2 is a diagram illustrating the configuration and process of an information processing device, which generates an encrypted document and a code-recorded document.

As shown in FIG. 2, the information processing device A 110 has a patient information database 112. In the patient information database 112, basic information, medical examination information, and the like of the patient which are inputted by the doctor or consultant, the operator, or the like are recorded. The information processing device A 110 is connected to other information processing terminals in that hospital via a network, such as an intranet or the like. The patient information database 112 stores input data from an information input section of the information processing device A 110 and input data from the respective terminals. Stored data is, for example, data corresponding to the ID of the patient, in which the basic information, the medical examination information, and the like are recorded.

The information processing device A 110 acquires data from the patient information database 112 via an information output section 113. Hereinafter, assuming that the code-recorded document (the letter of introduction 63) corresponding to the patient 30 is generated and the encrypted document including the medical information, such as the chart or the like, corresponding to the patient 30 is generated and stored in the information shared server 150, the processes of the respective blocks shown in FIG. 2 will be described.

The information output section 113 assigns, for example, the ID of the patient and acquires data, which is registered corresponding to the patient 30, from the patient information database 112. In acquired data, data not to be prevented from leaking, that is, data recordable in the letter of introduction 63, and individual data on privacy to be secured, such as the chart 61, diagnosis image data 62, and the like, are included.

The medical examination document including the chart 61, diagnosis image data 62, and the like is subjected to the encryption processing in an encryption processing section 115. The encryption key, which is used for the encryption in the encryption processing section 115, is generated by an key information generating section 114. For example, the encryption key of 64 bits or 128 bits is generated through a random number generation processing or the like. The key information generating section 114 generates different encryption keys with respect to the respective encrypted documents generated by the encryption processing section 115. An encryption algorithm, which is executed by the encryption processing section 115, includes, for example, DES, AES encryption algorithm, or the like.

With the encryption key generated by the key information generating section 114, the medical examination document including the chart 61, diagnosis image data 62, and the like is encrypted by the encryption processing section 115, and the encrypted document is stored in the information shared server 150 via a communication section 117 and the network 80. Moreover, the encrypted document to be transmitted to the information shared server 150 is correlated with the ID as the identification information for specifying data. The identification information (ID) is generated by an identification information generating section 116.

The identification information generating section 116 generates identification information, which is obtained by adding a hospital identification ID to the ID of the patient stored in the patient information database 112, as ID information corresponding to the encrypted document. Alternatively, the identification information generating section 116 generates an identifier corresponding to the letter of introduction 63 and sets that to ID information corresponding to the encrypted document. The ID may be identification data which can select and acquire the encrypted document stored in the information shared server 150.

The ID generated by the identification information generating section 116 is transmitted to the information shared server 150, together with the encrypted document. The information shared server 150 performs a data storage processing with the ID as an index such that the encrypted document can be acquired based on the ID.

The information shared server 150 performs, for example, a process of generating a management table, in which the ID is correlated with destination information of the encrypted document, and storing the management table in a database, at the time of the storage process of the encrypted document.

Figure 3A:
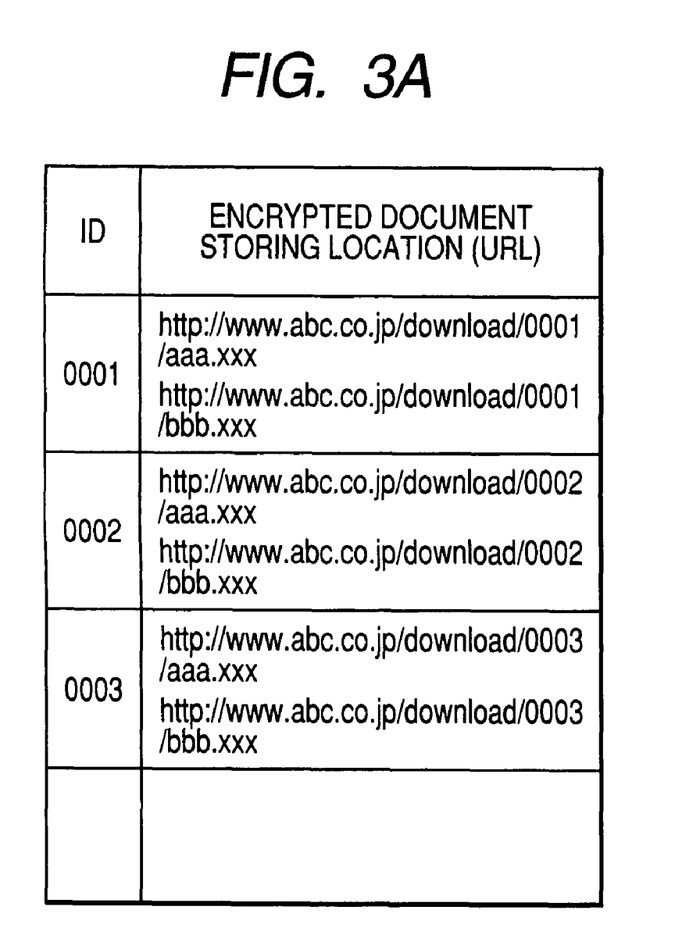
FIGS. 3A and 3B are diagrams illustrating examples of a management table of an ID serving as index data of an encrypted document stored in a server.
Figure 3B:
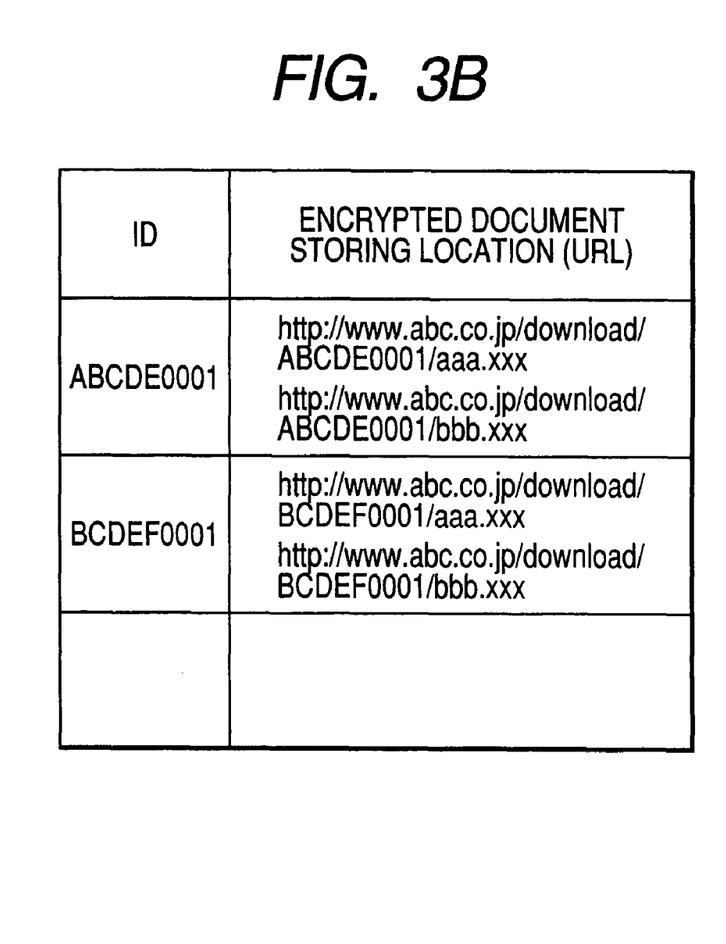

An example of the configuration of the management table will be described with reference to FIGS. 3A and 3B. FIG. 3A shows a management table in which a sequence number corresponding to the encrypted document is set as an ID and a URL according to a storing location of the encrypted document corresponding to the ID (sequence number) is recorded. FIG. 3B shows a management table in which a hospital code (ABCDE, BCDEF, or the like) and a sequence number (0001) is set as an ID and a URL according to a storing location of the encrypted document corresponding to the ID having the hospital code and the sequence number.

As described below, the ID is recorded in the letter of introduction 63 as code data and is read at the introduction destination hospital. Based on the read ID, an acquisition process of the encrypted document corresponding to the patient 30 is performed.

Encryption key data which is generated by the key information generating section 114 of the information processing device A 110 and is used for the encryption of the document, and the identification information (ID) generated by the identification information generating section 116 are subjected to an encoding processing by an encoding processing section 118. This is a process of generating code data to be recorded in the letter of introduction 63, which is handed over to the patient 30.

The encoding processing section 118 receives encryption key data generated by the key information generating section 114 and the identification information (ID) generated by the identification information generating section 116 and generates code data. Code data can include various kinds of code data.

For example, code data 200 is data in which encryption key data and the ID information as additional data are buried in image data obtained by copying a seal and has the data configuration in which the pixel values of pixels constituting image data obtained by copying the seal are changed based on the values of additional data. Moreover, the details of the additional data-buried configuration are disclosed in JP-A-2004-140764 and JP-A-2004-147253, which are filed in the name of the present applicant and are open to the public. Moreover, code data is not limited to the above-described configuration, but, for example, a bar code, a QR code, and other various codes can be used.

A document creating section 119 generates the letter of introduction 63, in which code data 200 including encryption key data and the ID information is recorded, as the code-recorded document. In the letter of introduction 63, the basic information of the patient, such as the name of the patient or the like, acquired from the patient information database 112, the opinion of the doctor, and the like are described. Further, in the letter of introduction 63, code data 200 generated by the encoding processing section 118, that is, code data including encryption key data generated by the key information generating section 114 and the identification information (ID) generated by the identification information generating section 116, is recorded.

The letter of introduction 63 as the code-recorded document is printed via an output section 120 and is handed over to the patient 30.

Next, the processing executed by the information processing device B 180 at the hospital B 20 (see FIG. 1) as the introduction destination, that is, an analysis of code recorded in the letter of introduction as the code-recorded document, an acquisition of the encrypted document from the information shared server, and a decoding process of the acquired encrypted document, will be described with reference to FIG. 4.

Like the information processing device A 110, the information processing device B 180 has a personal computer (PC) or the like. FIG. 4 shows a functional block diagram showing processing functions, which are executed in the parts of the information processing device B 180 and a data processing section, in respective blocks.

Figure 4:
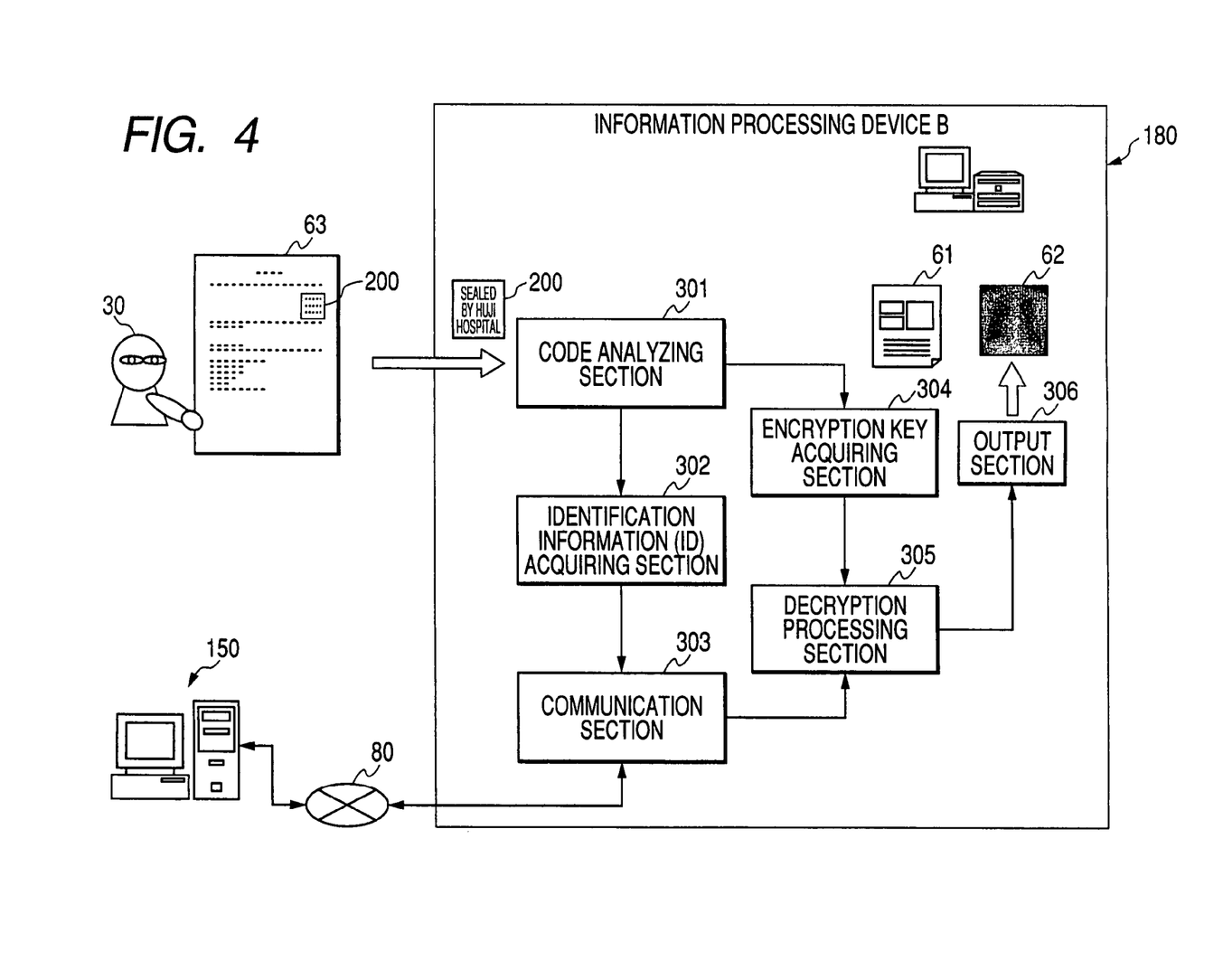
FIG. 4 is a diagram illustrating the configuration and process of an information processing device, which acquires and decodes an encrypted document.

A code analyzing section 301 of the information processing device B 180 shown in FIG. 4 reads code data 200 from the letter of introduction 30 as the code-recorded document that the patient 30 brings with him and analyzes code data 200. As described above, in code data 200, the ID information as index data of the encrypted document stored in the information shared server 150 and encryption key data are included. The code analyzing section 301 acquires the ID information and encryption key data through a code analysis processing.

As described above, code data 200 is, for example, constructed as data in which encryption key data and the ID information as additional data are buried in image data obtained by copying the seal and executes the analysis of the pixel values of the pixels constituting image data, which is obtained by copying the seal, to execute a process of acquiring the values of additional data. Moreover, the details of an analysis processing configuration of additional data are described in JP-A-2004-140764 and JP-A-2004-147253, which are filed in the name of the present applicant and are open to the public. Moreover, when code data is, for example, the bar code, the QR code, or other code modes, a code analysis is executed according to the code mode.

An identification information acquiring section 302 extracts, from analysis information of the code analyzing section 301, the ID information as index data of the encrypted document stored in the information shared server 150. The extracted ID is transmitted to the information shared server 150 via a communication section 303, such that the encrypted document corresponding to the ID is acquired.

An encryption key acquiring section 304 extracts the encryption key from the analysis information of the code analyzing section 301 and provides the extracted encryption key to a decryption processing section 305. The decryption processing section 305 executes the decoding process of the acquired encrypted document via the communication section based on the ID. The key used for the decoding processing is the encryption key acquired from code data 200 of the letter of introduction 63 by the encryption key acquiring section 304.

The medical examination document including the chart 61, diagnosis image data 62, and the like corresponding to the patient 30 to be decoded through the decoding processing is displayed on a display of the information processing device B 180 via an output section 306. Alternatively, the document may be outputted with the printer or the like.

As such, according to the configuration of the present invention, data as the confidential information stored in the information shared server 150 is stored as encrypted data, and thus information does not leak even when an unauthorized access to the server from the outside occurs. Further, key information used for the decoding of encrypted data is not stored in the information shared server 150, but is recorded in the code-recorded document that the patient 30 brings with him. Therefore, until the code analysis from the code-recorded document that the patient brings with him is performed, the encryption key cannot be acquired, such that the chart, diagnosis image information, and the like of the patient can be prevented from being decoded and used against the intension of the patient.

Moreover, encryption key data is generated at the medical institution, which issues the code-recorded document (the letter of introduction), but key data is eliminated when the recording processing to the code-recorded document is completed. Alternatively, key data may be temporarily held in a storage unit, to which an access from the outside is blocked, and may be eliminated under a condition that the processing completion of the code analysis is reported from the introduction destination.

Further, preferably, the information processing device B 180, which executes the acquisition and the decoding process of the encrypted document based on the letter of introduction, executes a user authentication processing to confirm whether or not the patient, who brings the code-recorded document (the letter of introduction) with him, is a person in question and executes the acquisition and the decoding process of the encrypted document under a condition that the authentication is established. The user authentication may include, for example, a password authentication or the like in the related art.

For example, a password generated by a user is transmitted and registered from the information processing device A 110 of the medical institution, which issues the code-recorded document (the letter of introduction), to the information shared server 150. The user inputs the password to the information processing device B 180, provided at the introduction destination hospital, which performs the analysis of the code-recorded document (the letter of introduction). The password is transmitted to the information shared server 150, such that the authentication is performed based on the comparison of the password. The information shared server 150 extracts the encrypted document corresponding to the ID extracted from code data recorded in the code-recorded document (the letter of introduction), under the condition that the comparison of the password is established, and transmits the extracted encrypted document to the information processing device B 180. As such, the processing is performed under the condition that the user authentication is established, and thus data management can be realized with high security. Moreover, the authentication processing is not limited to the password authentication, but may have the configuration to which other authentication sequences, such as biometrics, an authentication processing using an open key encryption method, or the like are applied.

Figure 5:
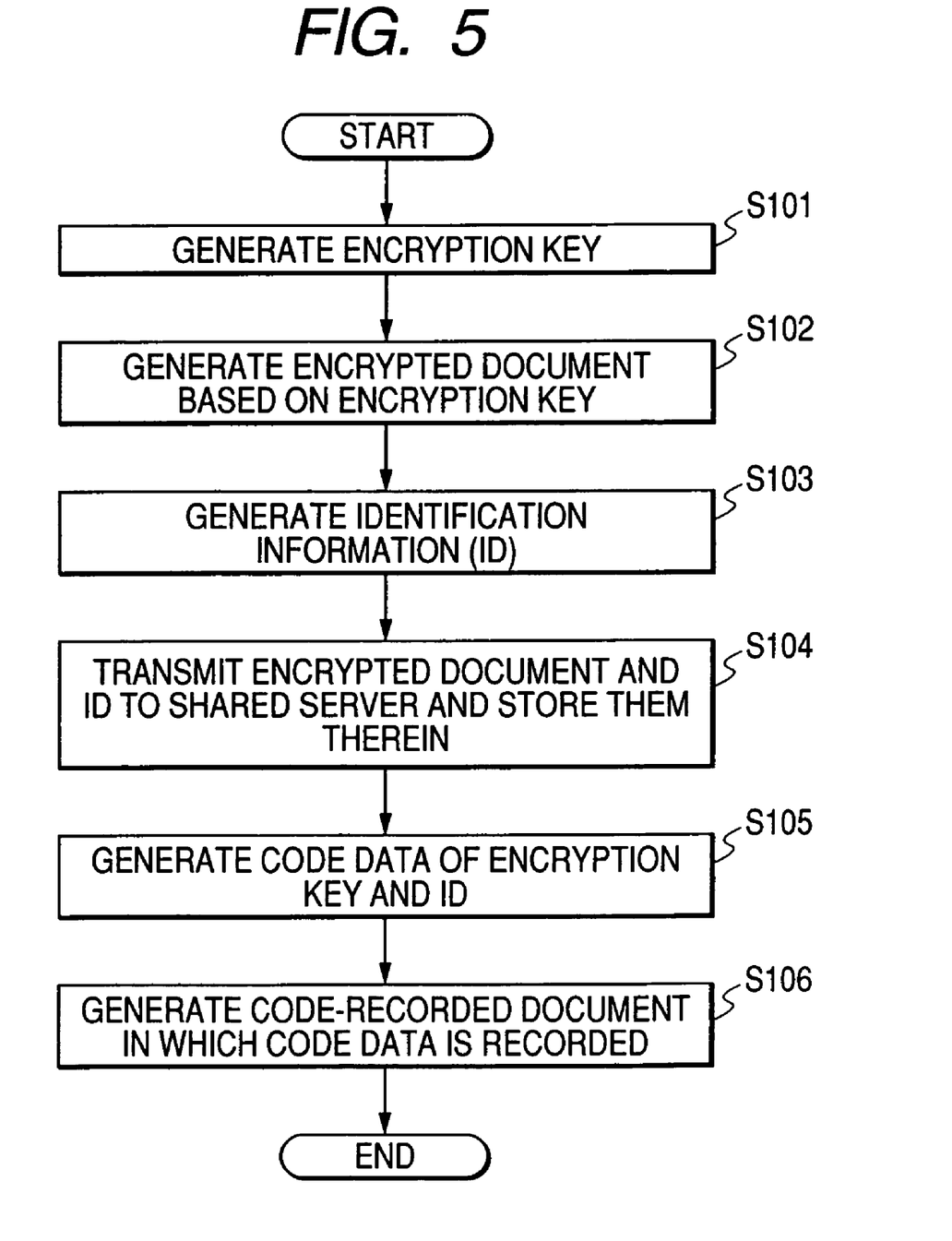
FIG. 5 is a flowchart illustrating a processing sequence of an information processing device, which generates an encrypted document and a code-recorded document.

Next, the sequence of the processing executed by the information processing device A 110 will be described with reference to a flowchart shown in FIG. 5. The information processing device A 110 generates the encrypted document including the medical examination information, such as the chart and the like and stores the encrypted document in the information shared server 150. Further, the information processing device A 110 generates the code-recorded document in which coded at a including the ID for specifying the encrypted document and encryption key data is recorded.

At a step S101, the information processing device A 110 generates the encryption key, which is used for the encryption of the document to be stored in the server. For example, encryption key data of 64 bits or 128 bits is generated through the random number generation processing or the like. At a step S102, the encryption process of the document stored in the server is executed with the generated encryption key.

At a step S103, the ID, which can be used as index data of the document to be stored in the server, is generated. Next, at a step S104, the encrypted document and the ID are transmitted to the server to be recorded therein.

At a step S105, the encoding process of the encryption key and the ID is executed. Code data is, for example, code data, which is generated by changing the pixel values of seal image data based on additional data, or the bar code, the QR code, or the like. At a step S106, the code-recorded document, such as the letter of introduction, in which code data is recorded, is generated.

Figure 6:
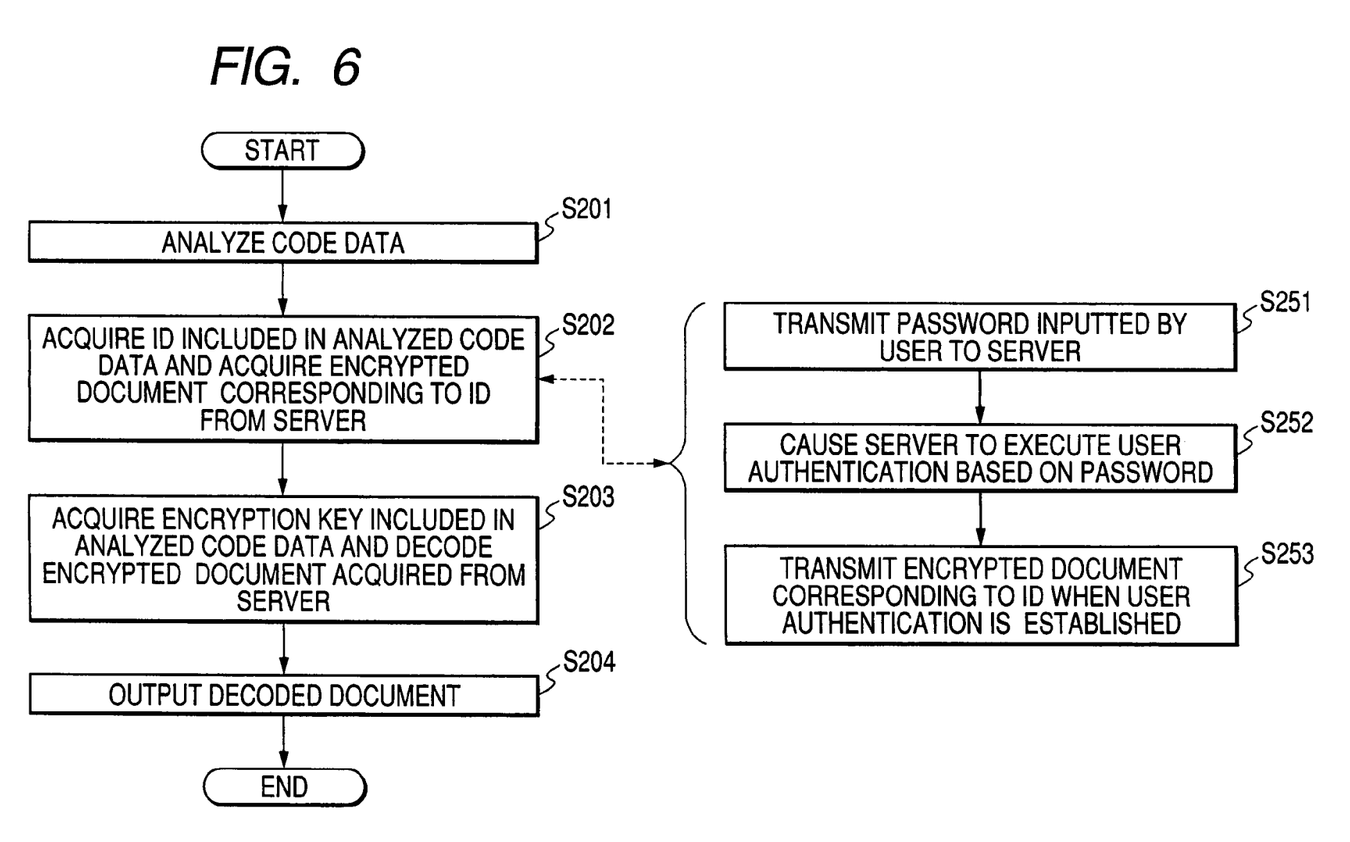
FIG. 6 is a flowchart illustrating a processing sequence of an information processing device, which acquires and decodes an encrypted document.

Next, the processing to be executed by the information processing device B 180, that is, the analysis of code data recorded in the letter of introduction as the code-recorded document, the acquisition of the encrypted document from the information shared server, and the decoding process of the acquired encrypted document, will be described with reference to a flowchart shown in FIG. 6.

At a step S201, the analysis of code data recorded in the code-recorded document is executed. Code data includes the encryption key and the ID information and the processing for acquiring the encryption key and the ID information is executed.

At a step S202, the ID included in analyzed code data is acquired and the encrypted document, which can be acquired with the ID as an index, is acquired from the server. Moreover, when the user authentication is performed as the acquisition condition of the encrypted document, steps S251 to S253 are performed.

At the step S251, the password inputted by the user is transmitted to the server. The step S252 represents the processing by the server and the user authentication is performed based on the comparison of the password recorded in advance at the time of the issuance process of the code-recorded document (the letter of introduction) and the received password. The step S253 is also the processing by the server, and the encrypted document corresponding to the ID is transmitted under the condition that the user authentication is established. With this processing, the encrypted document can be provided through the confirmation of the user.

A next step S203 is a processing by the information processing device B 180 after the encrypted document is received. At the step S203, the decoding process of the encrypted document received from the server is executed with the encryption key acquired from code data recorded in the code-recorded document. At a step S204, the decoded document is outputted on a display or is outputted with the printer.

As described above, according to the configuration of the present invention, data to be prevented from leaking, such as the individual confidential information or the like, is stored in the networked information shared server. In this case, shared data is stored while being encrypted. Further, key data used for the encryption and the decoding process of encrypted data is not stored in the server, but is recorded in the medium, which is provided to the user having the authority to access to the confidential information (for example, the patient), as code data. Therefore, as long as code data is not read from the medium held by the user having the authority to access, the configuration, in which data stored in the information shared server cannot be read and used, can be implemented. As a result, data cannot be read without permission of the specified user, and thus a secure data management can be realized.

Finally, examples of the hardware configurations of the information processing device A 110, the information processing device A 180, and the information shared server 150 will be described with reference to FIG. 7.

A CPU (Central Processing Unit) 501 is a control section for executing the processes according to a computer program, in which a data processing sequence of various data processes described in the above-described embodiment, that is, the generation or output process of the code-recorded document, the generation, acquisition, and decoding process of the encrypted document, the analysis process of code data, and the like is described.

A ROM (Read Only Memory) 502 stores a program used by the CPU 501, arithmetic parameters, and the like. A RAM (Random Access Memory) 503 stores a program used in the execution of the CPU 501, parameters, which suitably change in that execution, and the like. These parts are connected to one another via a host bus 504 having a CPU bus or the like.

The host bus 504 is connected to an external bus 506, such as a PCI (Peripheral Component Interconnect/Interface) bus or the like, via a bridge 505.

A keyboard 508 and a pointing device 509 are input devices, which are operated by the user. A display 510 includes a liquid crystal display device, a CRT (Cathode Ray Tube), or the like and displays various kinds of information in texts or images.

An HDD (Hard Disk Drive) 511 has a hard disk built-in and drives the hard disk to record or reproduce the program executed by the CPU 501 or information. The hard disk functions as, for example, the patient information database or a storage section of the encrypted document in the information shared server. In addition, the hard disk stores various computer programs, such as various data processing programs or the like.

A drive 512 reads out data or a program recorded in a removable recording medium 521, such as a magnetic disk, an optical disk, a magneto-optical disk, a semiconductor memory, or the like and supplies data or the program to the RAM 503 connected thereto via an interface 507, the external bus 506, the bridge 505, and the host bus 504. Like the hard disk, the removable recording medium 521 also functions as the patient information database or the storage section of the encrypted document in the information shared server.

A connection port 514 is a port for connecting an external connection apparatus 522 and has a connection section, such as the USB, the IEEE 1394, or the like. The connection port 514 is connected to the CPU 501 and the like via the interface 507, the external bus 506, the bridge 505, the host bus 504, and the like. A communication section 515 is connected to the network and executes a data communication processing with the outside.

Figure 7:
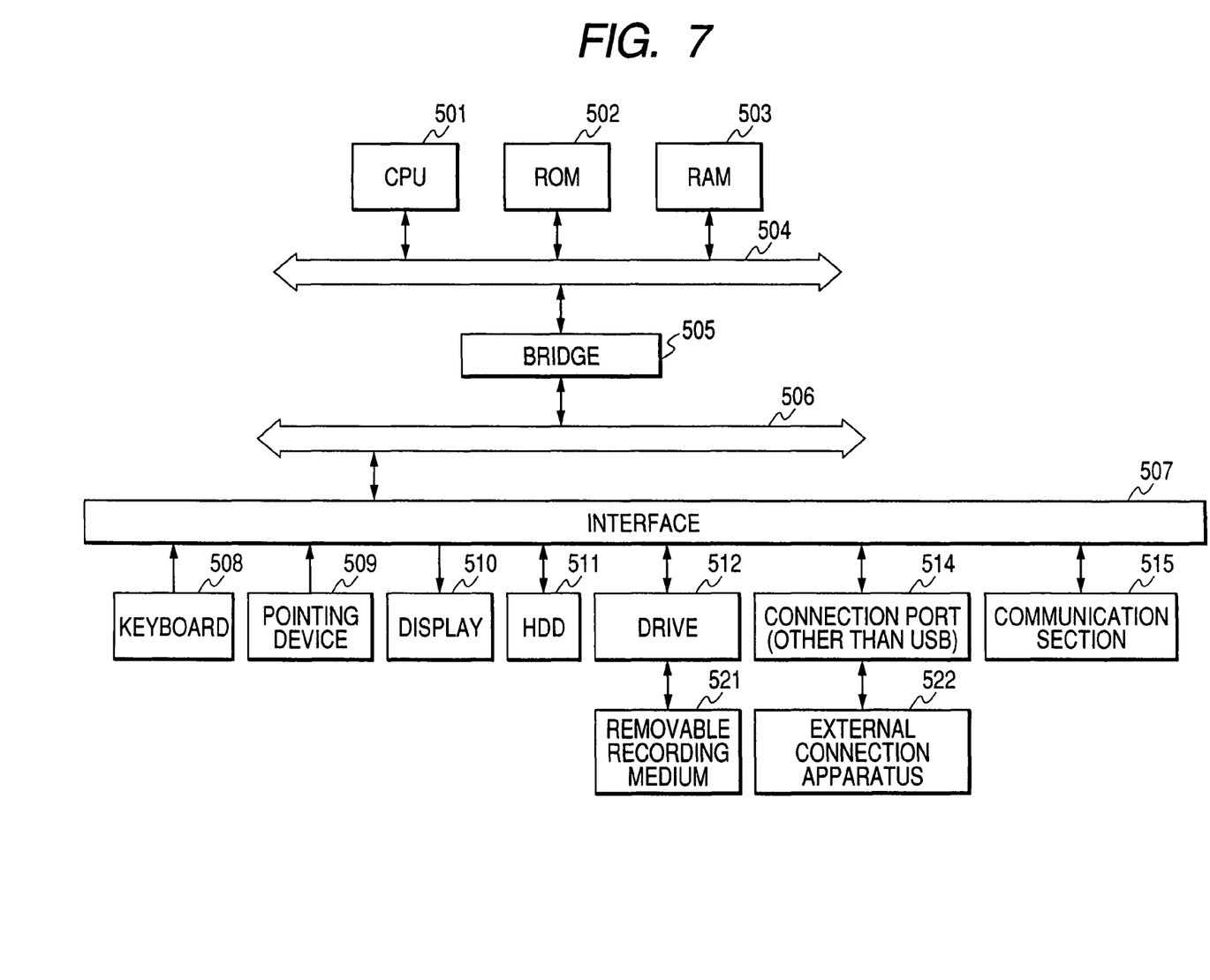
FIG. 7 is a diagram illustrating an example of hardware configurations of an information processing device and an information processing device constituting an information shared server.

Moreover, the example of the hardware configuration of the information processing device shown in FIG. 7 relates to the basic configuration of the personal computer. However, the information processing device of the present invention is not limited to the configuration shown in FIG. 7, but may have the configuration that can execute the processing described in the above-described embodiment.

As described, the present invention has been described in detail by way of the specified embodiment. However, it should be understood that changes or alternatives can be made by an ordinary skilled person in the related art with respect to the embodiment within the scope without departing from the subject matter of the present invention. That is, the above-described embodiment is just an example of the present invention and is not intended to limit the present invention. The subject matter of the present invention should be defined only through the appended claims.

Moreover, in the above-described embodiments, the encryption key used for the encryption processing. In order to raise the security level of the encrypted document, the encryption key and decryption key may differ for each document. As a method for differing the encryption key and decryption key, e.g. a public key cryptosystem such as the RSA by which a key pair of public and secret keys is generated may be used. For example, in the configuration shown in FIG. 2, in the key information generating section 114, a pair of encryption and decryption keys which are different each other is generated. The pair is transmitted to the encoding processing section, to be used for generation of a coded document. Here, after generating the decryption key the corresponding encryption key may be generated, or after generating the encryption key the corresponding decryption key may be generated.

Further, when the encryption and decryption keys are different, for the decryption processing the decryption key acquiring section instead of the encryption key acquiring section 304 is used. The method for acquiring is the same as that for the encryption key acquiring section. The decryption processing section 305 executes the decoding process of the encrypted document using the acquired decryption key. For these decryption processes, the same technique as the known technique using the encryption and decryption keys can be used.

Moreover, a series of processes described herein can be implemented with hardware, software, or the complex configuration of both. When the processing by software is executed, a program, in which the processing sequence is recorded, is installed in a memory of a computer, which is incorporated with dedicated hardware to be executed. Alternatively, the program may be installed in a general computer, which can execute various processes, to be executed.

For example, the program can be recorded in advance in the hard disk or the ROM (Read Only Memory) as a recording medium. Alternatively, the program may be stored (recorded) temporarily or permanently in the removable medium, the flexible disk, the CD-ROM (Compact Disc Read Only Memory), the MO (magnetic optical) disk, the DVD (Digital Versatile Disc), the magnetic disk, the semiconductor memory, or the like. Such a removable recording medium can be provided as so-called package software.

Moreover, instead of being installed from the above-described removable recording medium on the computer, the program may be transmitted from a download site to the computer in a wireless manner or may be transmitted to the computer via the network, such as the LAN (Local Area Network), the Internet, or the like, in a wired manner. In this case, the computer can receive the program transmitted in such a manner and install the program on the recording medium, such as the built-in hard disk, or the like.

Moreover, various processes described herein can be executed in time series, as described above, or can be executed in parallel or respectively according to the process capacity of the device, which executes the process, or if necessary. Further, the system described herein has a configuration of a logical assembly of plural devices. Here, the respective devices may be not housed in the same case.

As described above, according to the configuration of the present invention, data to be prevented from leaking, such as individual confidential information or the like, is stored in the networked information shared server. In this case, shared data is stored while being encrypted. Further, key data applied to the encryption and the decoding process of encrypted data is not stored in the server, but is recorded in a medium, which is provided to a user having the authority to access to the confidential information (for example, patient), as code data. Therefore, as long as code data is not read from the medium held by the user having the authority to access, the configuration, in which data stored in the information shared server cannot be read and used, can be implemented. As a result, data cannot be read without permission of the specified user, and thus a secure data management can be realized.

Further, the information processing device according to the embodiments of the present invention may further include an key information generating section that executes a generation process of an encryption key.

Further, in the information processing device according to the embodiments of the present invention, the key information generating section may generate different encryption keys with respect to encrypted documents generated by the encryption processing section.

Further, the information processing device according to the embodiments of the present invention may further include an key information generating section that executes a generation process of a pair of an encryption key and a decryption key.

Further, in the information processing device according to the embodiments of the present invention, the key information generating section may generate different pairs of the encryption key and the decryption key with respect to encrypted documents generated by the encryption processing section.

Further, in the information processing device according to the embodiments of the present invention, the encoding processing section may generate code data, in which a pixel-value change processing is performed on pixels constituting image data, based on configuration data of the decryption key and the ID.

Further, the information processing device according to the embodiments of the present invention may transmit the ID analyzed by the code analyzing section to a networked server via a communication section and receive the encrypted document, from which the ID is extracted by the server as an index.

Further, the information processing device according to the embodiments of the present invention may execute the decoding process of the encrypted document under a condition that user authentication is established.

Further, in the information processing device according to the embodiments of the present invention, the code analyzing section may analyze code data, in which a pixel-value change processing is performed on pixels constituting image data, based on configuration data of the decryption key and the ID.

Further, the document management system according to the embodiments of the present invention may further include a key information generating section that executes a generation process of an encryption key.

Further, the document management system according to the embodiments of the present invention may further includes an key information generating section that executes a generation process of a pair of an encryption key and a decryption key.

Further, the information processing method according to the embodiments of the present invention may further include a step of generating encryption key.

Further, in the information processing method according to the embodiments of the present invention, the key information generating step may generate different encryption keys with respect to encrypted documents generated in the encryption processing step.

Further, the information processing method according to the embodiments of the present invention may further include a step of generating a pair of an encryption key and a decryption key.

Further, in the information processing method according to the embodiments of the present invention, the key information generation processing may generate different pairs of the encryption key and the decryption key with respect to encrypted documents generated in the encryption document processing.

Further, in the information processing method according to the embodiments of the present invention, the encoding processing step may generate code data, in which a pixel-value change processing is performed on pixels constituting image data, based on configuration data of the decryption key and the ID.

Further, the information processing method according to the embodiments of the present invention may further include a step of transmitting the ID analyzed in the code analyzing step to a networked server via a communication section and a step of receiving the encrypted document, from which the ID is extracted by the server as an index.

Further, the information processing method according to the embodiments of the present invention may execute decoding of the encrypted document under a condition that user authentication is established.

Further, in the information processing method according to the embodiments of the present invention, the code analyzing step may analyze code data, in which a pixel-value change processing is performed on pixels constituting image data, based on configuration data of the decryption key and the ID.

Moreover, the computer program of the present invention is, for example, a computer program that can be provided to a computer system, which can execute various program codes, through a storage medium of a computer readable format, a communication medium, a recording medium, such as CD, FD, MO, or the like, or a communication medium, such as a network or the like. Such a program can be provided in the computer readable format, and thus the processing according to the program is realized on the computer system.

Other effects, features, and advantages of the present invention will be apparent from the detailed description by way of an embodiment of the present invention described below and the accompanying drawings. Moreover, the system described herein has a configuration of a logical assembly of plural devices. Here, the respective devices may be not housed in the same case.

According to the configuration of the present invention, data to be prevented from leaking, such as individual confidential information or the like, is stored in the networked information shared server. In this case, shared data is stored while being encrypted. Further, key data applied to the encryption and the decoding process of encrypted data is not stored in the server, but is recorded in a medium, which is provided to a user having the authority to access to the confidential information (for example, patient), as code data. Therefore, as long as code data is not read from the medium held by the user having the authority to access, the configuration, in which data stored in the information shared server cannot be read and used, can be implemented. As a result, data cannot be read without permission of the specified user, and thus a secure data management can be realized.

The entire disclosure of Japanese Patent Application No. 2005-041708 filed on Feb. 17, 2005 including specification, claims, drawings and abstract is incorporated herein by reference in its entirety.

What is claimed is:

1. An information processing device, which generates a document and performs encryption thereof, the information processing device comprising:
a processor;
a key information generating section that generates an encryption key;
an encryption processing section that generates an encrypted document through a document encryption processing using the encryption key;
an encoding processing section that automatically generates code data to be printed out on a document, the code data includes a decryption key for decrypting the encrypted document and for retrieving an ID associated with the encryption document, which serves as index data of the encrypted document;
a document creating section that generates a code-recorded document, in which the code data including the decryption key and the ID is recorded;
an output section that prints the code-recorded document for decrypting the encrypted document at a remote location; and
a communication section that transmits the encrypted document and the ID to a server, wherein
the processor controls the encryption processing section, the encoding processing section, the document creating section and the communication section, and
the ID is obtained by adding a hospital ID to a patient ID stored in a patient information database.

2. The information processing device according to claim 1, wherein the key information generating section generates different encryption keys with respect to encrypted documents generated by the encryption processing section.

3. The information processing device according to claim 1, wherein the key information generating section executes a generation process of a pair of the encryption key and the decryption key.

4. The information processing device according to claim 3, wherein the key information generating section generates different pairs of the encryption key and the decryption key with respect to encrypted documents generated by the encryption processing section.

5. The information processing device according to claim 1, wherein the encoding processing section generates code data, in which a pixel-value change process is performed on pixels constituting image data, based on configuration data of the decryption key and the ID.

6. An information processing device, which executes a decoding process of an encrypted document, the information processing device comprising:
   a processor;
   a code analyzing section that reads code data from a printed code-recorded document that is printed at a remote location, in which code data including a decryption key for decrypting the encrypted document and for retrieving an ID associated with the encryption document, serving as index data of the encrypted document is recorded, and that executes an analysis process by decrypting the encrypted document and retrieving the ID;
   a decryption key acquiring section that acquires the decryption key included in data analyzed by the code analyzing section; and
   a decryption processing section that executes a decoding process of an encrypted document corresponding to the ID analyzed by the code analyzing section using the decryption key acquired by the decryption key acquiring section, wherein
   the processor controls the code analyzing section, the decryption key acquiring section and the decryption processing section, and
   the ID is obtained by adding a hospital ID to a patient ID stored in a patient information database.

7. The information processing device according to claim 6, wherein the information processing device transmits the ID analyzed by the code analyzing section to the server via a communication section, and receives the encrypted document, from which the ID is extracted by the server as an index.

8. The information processing device according to claim 6, wherein the information processing device executes a decoding process of the encrypted document under a condition that user authentication is established.

9. The information processing device according to claim 6, wherein the code analyzing section analyzes code data, in which a pixel-value change processing is performed on pixels constituting image data, based on configuration data of the decryption key and the ID.

10. A document management system comprising:
    a document generating device that generates a document and performs encryption thereof;
    an information shared server that stores an encrypted document generated by the document generating device; and
    a document utilizing device that acquires and decodes the encrypted document stored in the information shared server,
    wherein the document generating device has:
    a processor;
    a key information generating section that generates an encryption key;
    an encryption processing section that executes an encryption process of the document to generate the encrypted document using the encryption key;
    a document creating section that generates a code-recorded document, in which code data including a decryption key for the decryption process of the encrypted document and for retrieving an ID associated with the encryption document, serving as index data of the encrypted document is recorded;
    an output section that prints the code-recorded document for decrypting the encrypted document at a remote location; and
    a communication section that transmits the encrypted document and the ID to the information shared server,
    wherein the processor controls the encryption processing section, the document creating section and the communication section,
    the information shared server has:
    a database, from which the encrypted document can be acquired with the ID as an index, and the document utilizing device has: a code analyzing section that analyzes code data recorded in the printed code-recorded document to acquire the decryption key and the ID; and
    a decryption processing section that decodes the encrypted document acquired from the information shared server with the ID as an index, and
    the ID is obtained by adding a hospital ID to a patient ID stored in a patient information database.

11. The document management system according to claim 10, wherein the key information generating section executes a generation process of a pair of the encryption key and the decryption key.

12. An information processing method, which generates a document and performs encryption thereof, the information processing method comprising:
    generating an encryption key;
    generating an encrypted document through a document encryption processing using the encryption key;
    generating code data to be printed out on the document, the code data includes a decryption key for decrypting the encrypted document and for retrieving an ID associated with the encryption document, which serves as index data of the encrypted document;
    generating a code-recorded document, in which code data including the decryption key and the ID is recorded;
    printing the code-recorded document for decrypting the encrypted document at a remote location; and
    transmitting the encrypted document and the ID to a server, wherein
    the ID is obtained by adding a hospital ID to a patient ID stored in a patient information database, and
    at least one of the steps is executed by a processor.

13. The information processing method according to claim 12, wherein the key information generation processing generates different encryption keys with respect to encrypted documents generated in the encryption document processing.

14. The information processing method according to claim 12, further including a step of generating a pair of the encryption key and the decryption key.

15. The information processing device according to claim 14, wherein the key information generation processing generates different pairs of the encryption key and the decryption key with respect to encrypted documents generated in the encryption document processing.

16. The information processing method according to claim 12, wherein the generating code data generates code data, in which a pixel-value change processing is performed on pixels constituting image data, based on configuration data of the decryption key and the ID.

17. An information processing method, which executes a decoding process of an encrypted document, the information processing method comprising:

reading code data from a printed code-recorded document, in which code data including a decryption key for decrypting the encrypted document and for retrieving an ID associated with the encryption document, serving as index data of an encrypted document is recorded, the code-recorded document printed at a remote location, and executing an analysis processing by decrypting the encrypted document and retrieving the ID;

acquiring the decryption key included in data analyzed in the analysis processing;

executing a decrypting process of an encrypted document corresponding to the ID analyzed in the analysis processing by using the decryption key acquired in the acquiring the decryption key; and outputting the decrypted document on a display or a printer, wherein the ID is obtained by adding a hospital ID to a patient ID stored in a patient information database.

18. The information processing method according to claim 17, further comprising:

transmitting the ID analyzed in the analysis processing to the server via a communication section; and receiving an encrypted document, from which the ID is extracted by the server as an index.

19. The information processing method according to claim 17, wherein the information processing method executes decoding of the encrypted document under a condition that user authentication is established.

20. The information processing method according to claim 17, wherein the analysis processing analyzes code data, in which a pixel-value change processing is performed on pixels constituting image data, based on configuration data of the decryption key and the ID.

21. A storage medium readable by a computer, the storage medium storing a program of instructions executable by the computer to perform a function for performing a generation processing and an encryption process of a document, the function comprising the steps of:

generating an encryption key;

generating an encrypted document through a document encryption processing using the encryption key;

generating code data to be printed out on the document, the code data includes a decryption key for decrypting the encrypted document and for retrieving an ID associated with the encryption document, which serves as index data of the encrypted document;

generating a code-recorded document, in which code data including the decryption key and the ID is recorded;

printing the code-recorded document for decrypting the encrypted document at a remote location; and transmitting the encrypted document and the ID to a server, wherein the ID is obtained by adding a hospital ID to a patient ID stored in a patient information database.

22. A storage medium readable by a computer, the storage medium storing a program of instructions executable by the computer to perform a function for performing a decoding process of an encrypted document, the function comprising the steps of:

reading code data from a printed code-recorded document, in which code data including a decryption key for decrypting the encrypted document and for retrieving an ID associated with the encryption document, serving as index data of an encrypted document is recorded, the code-recorded document printed at a remote location, and executing an analysis processing by decrypting the encrypted document and retrieving the ID;

acquiring the decryption key included in data analyzed in the analysis processing; and executing a decoding process of the encrypted document corresponding to the ID analyzed in the analysis processing by using the decryption key acquired in the acquiring the encryption key, wherein the ID is obtained by adding a hospital ID to a patient ID stored in a patient information database.

* * * * *